US008891671B2

(12) United States Patent
Li

(10) Patent No.: US 8,891,671 B2
(45) Date of Patent: Nov. 18, 2014

(54) METHOD, APPARATUS AND SYSTEM FOR CALIBRATING CHANNEL

(71) Applicant: Huawei Technologies Co., Ltd., Shenzhen (CN)

(72) Inventor: Shaoming Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/788,036

(22) Filed: Mar. 7, 2013

(65) Prior Publication Data

US 2013/0182793 A1 Jul. 18, 2013

Related U.S. Application Data

(63) Continuation of application No. PCT/CN2010/076741, filed on Sep. 8, 2010.

(51) Int. Cl.
*H04K 1/02* (2006.01)
*H01Q 3/26* (2006.01)
*H04B 15/00* (2006.01)
*H04B 17/00* (2006.01)

(52) U.S. Cl.
CPC ............. *H04B 15/00* (2013.01); *H01Q 3/267* (2013.01); *H04B 17/0012* (2013.01)
USPC .......... 375/296; 375/295; 375/297; 375/298; 375/299; 455/67.11; 455/67.14; 455/69; 455/101; 455/115.1; 455/115.2; 455/126; 455/562.1

(58) Field of Classification Search
CPC ....................... H04W 52/08; H04L 2027/0053
USPC ........... 375/267, 297, 299; 370/280; 455/101, 455/562.1
See application file for complete search history.

(56) References Cited

U.S. PATENT DOCUMENTS 6,157,343 A    12/2000  Andersson et al.
7,228,113 B1 *  6/2007  Tang et al. .................... 455/101

(Continued)

FOREIGN PATENT DOCUMENTS

CN    1783748    6/2006
CN    1804656    7/2006

(Continued)

OTHER PUBLICATIONS

International Search Report of Corresponding PCT Application PCT/CN2010/076741 mailed Jun. 16, 2011.

(Continued)

*Primary Examiner* — Daniel Washburn
*Assistant Examiner* — Eboni Hughes
(74) *Attorney, Agent, or Firm* — Staas & Halsey LLP

(57) ABSTRACT

A method for calibrating a channel which includes: performing slide-window correlation on a delayed downlink service signal of a current transmit channel and a feedback signal of the transmit channel, and performing sampling to obtain a group of correlation values of the transmit channel in a sliding window; determining a peak amplitude value among amplitude values of the group of correlation values in the sliding window, and amplitude values at two points that are left adjacent and right adjacent to a point corresponding to the peak amplitude value; performing an interpolation operation on the peak amplitude value and the amplitude values at the two points that are left adjacent and right adjacent to the point to obtain an amplitude value, a delay and a phase at an actual peak point in the group of correlation values of the transmit channel in the sliding window; and calibrating the transmit channel.

12 Claims, 8 Drawing Sheets

(56) References Cited

U.S. PATENT DOCUMENTS

| | | | |
|---|---|---|---|
| 7,801,564 | B2 | 9/2010 | Chae et al. |
| 2006/0135211 | A1 | 6/2006 | Chae et al. |
| 2007/0147537 | A1* | 6/2007 | Lee et al. ............... 375/267 |
| 2009/0147900 | A1* | 6/2009 | Lee et al. ............... 375/362 |
| 2009/0285330 | A1* | 11/2009 | Premakanthan et al. ..... 375/297 |
| 2009/0290517 | A1 | 11/2009 | Rao et al. |

FOREIGN PATENT DOCUMENTS

| | | |
|---|---|---|
| CN | 1852275 | 10/2006 |
| CN | 1859031 | 11/2006 |
| CN | 1960528 | 5/2007 |
| CN | 101304276 | 11/2008 |
| CN | 101572576 | 11/2009 |
| WO | 2009/142691 | 11/2009 |

OTHER PUBLICATIONS

PCT Written Opinion (PCT/ISA/237), mailed Jun. 16, 2011 in corresponding International Patent Application No. PCT/CN2010/076741 (4 pages) (4 pages English translation).

PCT International Search Report (PCT/ISA/210, 220) of Jun. 16, 2011 in corresponding International Patent Application No. PCT/CN2010/076741 (8 pages) (5 pages English translation).

Geng Xin-tao "A Method of Amplitude and Phase Calibration for Phased Array Antennas Transmit System", May 21, 2007, China Electronics Technology Group Corporation No. 54th Research Institute Shijiazhuang, Hebei 050081, China, www.cnki.net (pp. 59-61).

European Search Report mailed Jun. 3, 2013 in corresponding European Patent Application No. 10847273.9-1855/2602867 PCT/CN2010076741 (10 pages).

"Vector Peak Interpolation", An algorithm for finding a maximum or a minimum in a sampled signal. Apr. 10, 2001, Section 2. (3 pages).

* cited by examiner

METHOD, APPARATUS AND SYSTEM FOR CALIBRATING CHANNEL

CROSS-REFERENCE TO RELATED APPLICATIONS

This application is a continuation of International Application No. PCT/CN2010/076741, filed on Sep. 8, 2010, which is hereby incorporated by reference in its entirety.

FIELD OF THE INVENTION

Embodiments of the present invention relate to the field of communication technologies, and in particular, to a method, an apparatus and a system for calibrating a channel.

BACKGROUND OF THE INVENTION

In a multi-antenna beamforming system such as a smart antenna system, a multi-input multi-output (MIMO, Multi-Input Multi-Output) system, and an active antenna system, the amplitude and phase are adjusted on different channels by using multiple transmit channels, and transmitted signals are superposed on an air interface to form different spatial beams. Due to many active and passive circuits on each channel and due to an unavoidable phase difference caused by factors such as local oscillation, transmit channels have different delays, amplitudes, and phases. Therefore, the channels need to be calibrated and the difference needs to be compensated, and signals of the same phase among air-interface combined signals can be superposed and signals of different phases among the air-interface combined signals can be offset according to expected directions, to from a desired transmission pattern and ensure normal working of transmitting beamforming in a multi-antenna system.

The channel calibration scheme in the prior art is shown in FIG. 1 and described as follows:

Generally, a probe signal whose power is far less than the power of a service signal is transmitted, for example, a probe signal whose power is lower than the power of the service signal by −30 dB, which is generally a pseudo random signal (PN, Pseudo Random Noise). A many-to-one combiner is used to combine signals on multiple channels by multiple feedback paths, and then a slide-window correlation matching with the transmitted probe signal is performed in a digital domain to detect the delay, amplitude and phase of each transmit channel.

In the process of implementing the present invention, the inventor finds at least the following disadvantages in the existing method of calibrating a channel by using a probe signal:

The probe signal causes interference to a service signal, where the detection and control of the interference is complicated. The power of a service signal fluctuates, and the power of a probe signal also needs to be adjusted adaptively to avoid impact on the service signal. The current high spectrum efficiency modulation modes, such as 16-Quadrature Amplitude Modulation (QAM, Quadrature Amplitude Modulation) and 64-QAM, impose a higher requirement on noise than the Quadrature Phase Shift Keying (QPSK, Quadrature Phase Shift Keying), and require lower impact caused by the probe signal. Such an adaptation process increases complexity of detection and control.

SUMMARY OF THE INVENTION

Embodiments of the present invention provide a method, an apparatus, and a system for calibrating a channel to avoid interference caused by a probe signal to a service signal.

The embodiments of the present invention are implemented by using the following technical solutions:

An embodiment of the present invention provides a method for calibrating a channel, including:

performing slide-window correlation on a delayed downlink service signal of a current transmit channel and a feedback signal of the transmit channel, and performing sampling to obtain a group of correlation values of the transmit channel in a sliding window, where the sliding window is a time window for sampling the correlation values;

determining a peak amplitude value among amplitude values of the group of correlation values in the sliding window, and amplitude values at two points that are left adjacent and right adjacent to a point corresponding to the peak amplitude value;

performing an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window; and calibrating the transmit channel according to the amplitude value, the delay, and the phase at the actual peak point.

An embodiment of the present invention provides an apparatus for calibrating a channel, including:

a first obtaining unit, configured to obtain a delayed downlink service signal of a current transmit channel;

a delay controller, configured to control the first obtaining unit to obtain the delayed downlink service signal of the current transmit channel after the specific time of delay;

a second obtaining unit, configured to obtain a feedback signal of the channel;

a slide-window correlation unit, configured to perform slide-window correlation on the obtained delayed downlink service signal and the obtained feedback signal of the channel, and perform sampling to obtain a group of correlation values of the channel in a sliding window, where the sliding window is a time window for sampling the correlation values;

a determining unit, configured to determine a peak amplitude value among amplitude values of the group of correlation values in the sliding window, and amplitude values at two points that are left adjacent and right adjacent to a point corresponding to the peak amplitude value;

a calculating unit, configured to perform an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window; and a calibrating unit, configured to calibrate the transmit channel according to the amplitude value, the delay, and the phase at the actual peak point.

An embodiment of the present invention provides a multi-antenna beamforming system, including the foregoing apparatus for calibrating a channel, which is configured to calibrate each transmit channel.

As can be seen from the technical solutions provided in the embodiments of the present invention, in the embodiments of the present invention, slide-window correlation is performed on a delayed downlink service signal of a current transmit channel and a feedback signal of the transmit channel, and a group of correlation values of the transmit channel in a sliding window are obtained by sampling, where the sliding window is a time window for sampling the correlation values; a peak amplitude value among amplitude values of the group of correlation values in the sliding window is determined, and amplitude values of two points that are left adjacent and right adjacent to a point corresponding to the peak amplitude value are determined; an interpolation operation is performed on the peak amplitude value and the amplitude values of the two points that are left adjacent and right adjacent to the point to obtain an amplitude value, a delay and a phase at an actual peak point in the group of correlation values of the transmit channel in the sliding window; and the transmit channel is calibrated according to the amplitude value, the delay and the phase at the actual peak point. In this way, the channel is calibrated by using the structure of the service signal, without the need of transmitting a probe signal; and interference caused by the probe signal to the service signal is avoided while the channel is calibrated.

DETAILED DESCRIPTION OF THE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
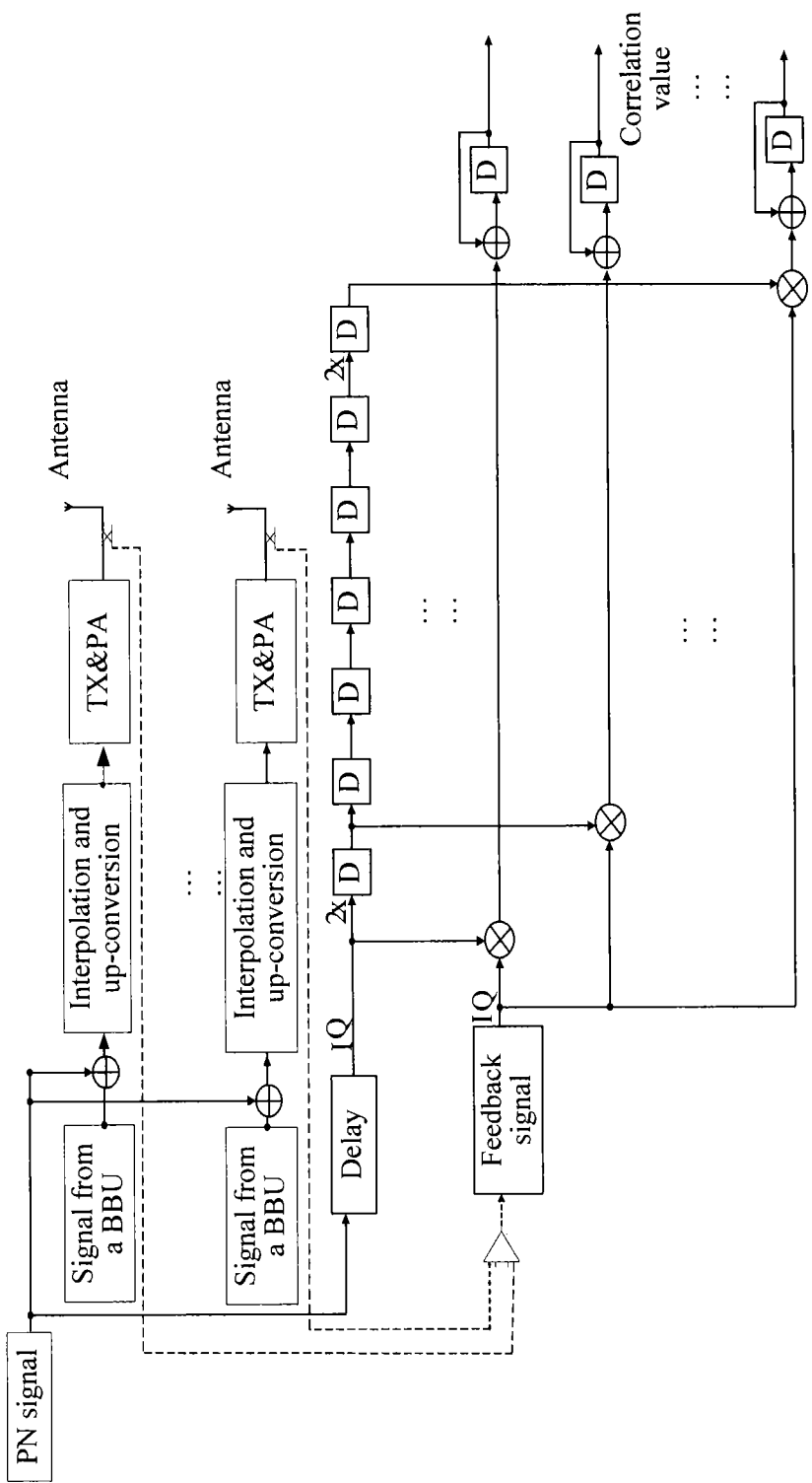
FIG. 1 is a schematic diagram of calibrating a channel in the prior art.
Figure 2:
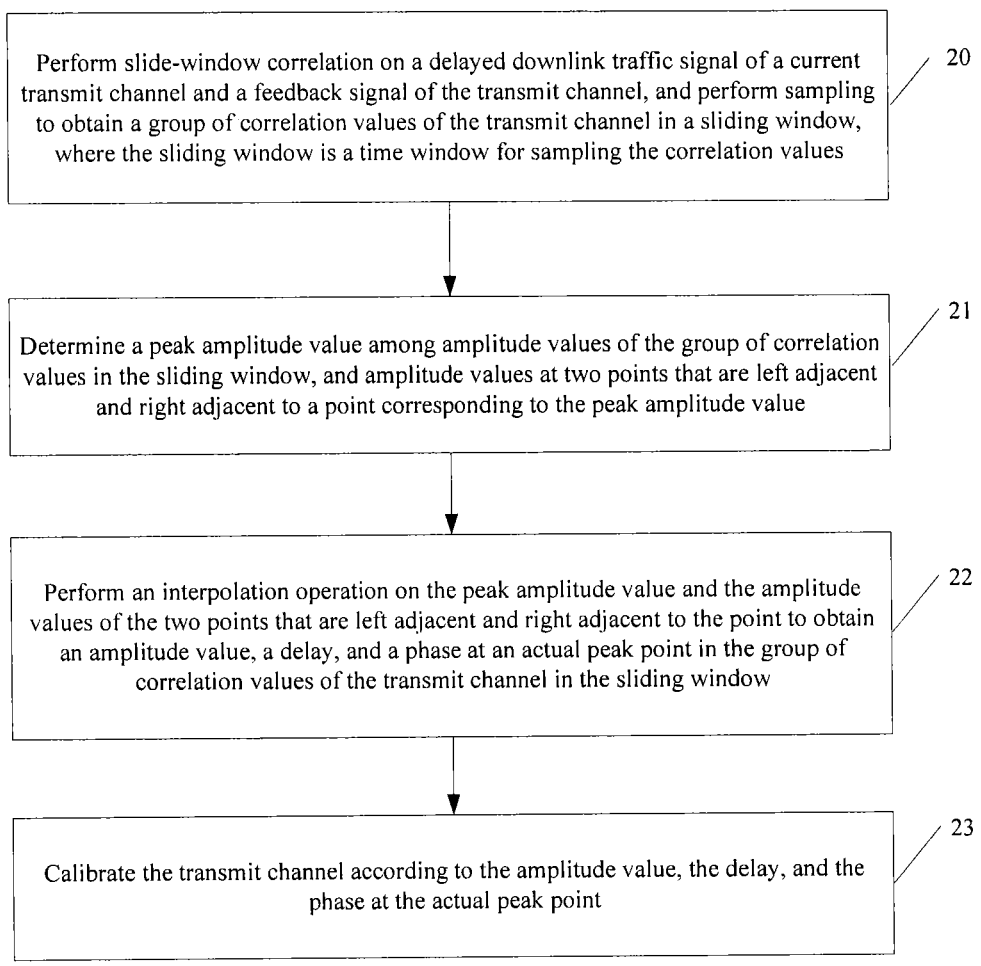
FIG. 2 is a flowchart of a method for calibrating a channel according to an embodiment of the present invention.

An embodiment of the present invention provides a method for calibrating a channel. As shown in FIG. 2, the method includes the following steps:

Step 20: Perform slide-window correlation on a delayed downlink service signal of a current transmit channel and a feedback signal of the transmit channel, and perform sampling to obtain a group of correlation values of the transmit channel in a sliding window, where the sliding window is a time window for sampling the correlation values.

Step 21: Determine a peak amplitude value among amplitude values of the group of correlation values in the sliding window, and amplitude values at two points that are left adjacent and right adjacent to a point corresponding to the peak amplitude value.

Step 22: Perform an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window.

Step 23: Calibrate the transmit channel according to the amplitude value, the delay, and the phase at the actual peak point.

In step 20, optionally, before the slide-window correlation is performed on the delayed downlink service signal of the current transmit channel and the feedback signal of the transmit channel, the feedback signal of the transmit channel is descrambled and coherent-accumulated.

The size of the sliding window in the embodiment of the present invention depends on a predicted delay difference between channels. Assuming that the size of the sliding window is greater than a relative delay difference between channels, the correlation length of the slide-window may be more than 100 sampling points, for example, 300 sampling points.

In addition, the downlink service signals mentioned in the embodiment of the present invention include, but are not limited to, a dedicated service signal of a common channel in a global system for mobile communications (GSM, Global System for Mobile Communications), such as a dedicated service signal of a broadcast control channel (BCCH, Broadcast Control Channel); and a continuous service signal of a common pilot channel (CPICH, Common Pilot Channel) transmitted by each sector in CDMA2000/WCDMA/HSPA; and a service signal of a CPICH in a long term evolution (LTE, Long Term Evolution), where each sector has the CPICH.

In step 21, the method for determining a peak amplitude value among amplitude values of the group of correlation values in the sliding window and amplitude values at two points that are left adjacent and right adjacent to a point corresponding to the peak amplitude value may be: using an I value and a Q value of each sampling point in the group of correlation values to calculate an amplitude value of each sampling point according to the following formula:

$$p=\sqrt{I^2+Q^2}, \exp(j*\theta)=(I+jQ)/\sqrt{I^2+Q^2},$$

where p represents an amplitude value at a current sampling point in the group of correlation values; I represents an in-phase part of data at the current sampling point in the group of correlation values; Q represents a quadrature part of data at the current sampling point in the group of correlation values; j represents an imaginary unit; θ represents a phase at the current sampling point in the group of correlation values; and exp(j*θ) represents a complex phase.

Figure 3:
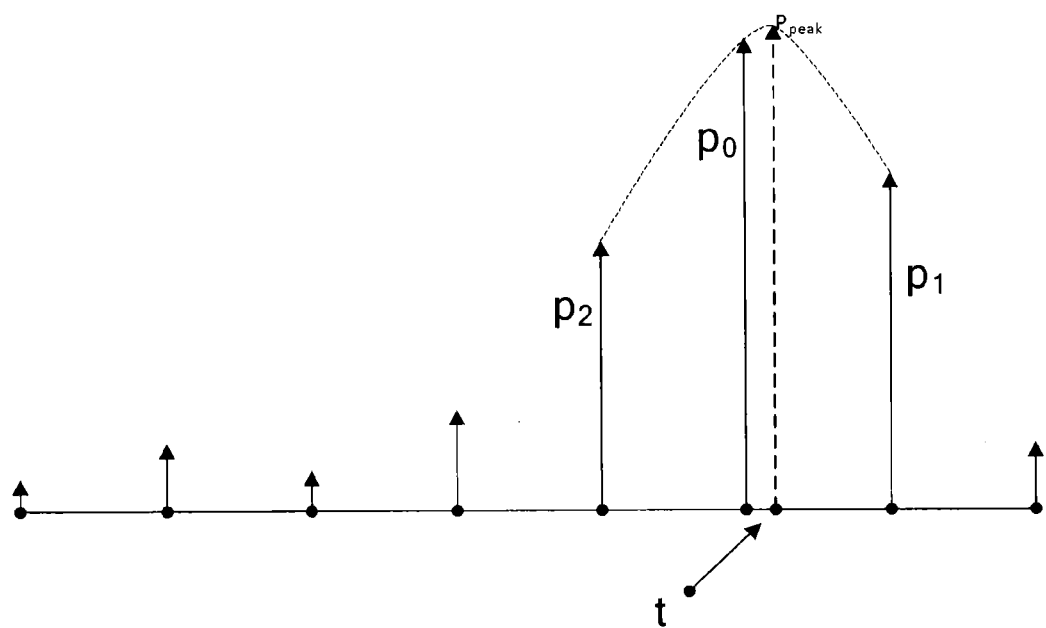
FIG. 3 is a schematic method diagram of performing an interpolation operation to calculate an amplitude value, a delay, and a phase at an actual peak point according to an embodiment of the present invention.

The peak amplitude value, determined according to a calculation result, among amplitude values at multiple sampling points in the group of correlation values in the sliding window is designated as P0; and the amplitude values at two points that are left adjacent and right adjacent to a point corresponding to the peak amplitude value are designated as P1 and P2, respectively, as shown in FIG. 3.

In step 22, the method of performing an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window specifically includes:

using the following formula to calculate a delay τ and an amplitude value $p_{peak}$ at the actual peak point:

$$\tau = \frac{p_1 - p_2}{2p_0 - (p_1 + p_2)} \frac{T_c}{2},$$

where $T_c$ represents a chip duration, $P_0$ is a peak amplitude value among amplitude values at multiple sampling points in the group of correlation values in the sliding window, and $P_1$ and $P_2$ are amplitude values at two points that are left adjacent and right adjacent to a point corresponding to the peak amplitude value;

$$p_{peak} = p_0 + \frac{1}{8} * \frac{(p_1 - p_2)^2}{(2p_0 - (p_1 + p_2))}$$

and then using the following formula to calculate a phase value $\exp(j\theta_{peak})$ at the actual peak point:

$$\exp(j\theta_{peak}) = \frac{\text{phaser}}{\sqrt{I_{Phaser}^2 + Q_{Phaser}^2}},$$

where, $$\text{phaser} = \frac{p_0 \exp(j\theta_0) + p_1 \exp(j\theta_1) + p_2 \exp(j\theta_2)}{p_0 + p_1 + p_2},$$

where phaser represents a value obtained after weighted-averaging is performed on a point corresponding to the peak amplitude value among amplitude values at multiple sampling points in the group of correlation values and two adjacent points, $\theta_0$ represents a peak phase value corresponding to the peak amplitude value among amplitude values at multiple sampling points in the group of correlation values in the sliding window, $\theta_1$ and $\theta_2$ represent phase values corresponding to the amplitude values $P_1$ and $P_2$ at the two points that are left adjacent and right adjacent to the point corresponding to the peak amplitude value, respectively; $P_0$ is a peak amplitude value among amplitude values at multiple sampling points in the group of correlation values in the sliding window, $P_1$ and $P_2$ are amplitude values at the two points that are left adjacent and right adjacent to the point corresponding to the peak amplitude value, $I_{phaser}$ represents the in-phase part of the actual peak point, and $Q_{phaser}$ represents the quadrature part of the actual peak point.

In step 23, calibrating the transmit channel according to the amplitude value, the delay, and the phase at the actual peak point includes: using the amplitude value, delay and phase at the actual peak point to compensate the corresponding amplitude value, delay and phase of a signal of the transmit channel to implement calibration.

The embodiment of the present invention is applicable to channel calibration for a multi-antenna beamforming system of various wireless communication systems such as a global system for mobile communications (GSM, Global System for Mobile Communications), code division multiple access (CDMA, Code Division Multiple Access) 2000, wideband code division multiple access (WCDMA, Wideband Code Division Multiple Access)/high speed packet access (HSPA, high Speed Packet Access), time division-synchronization code division multiple access (TD-SCDMA, Time-Division Synchronization Code Division-Multiple-Access), time division duplex-long term evolution (TDD-LTE, Time Division Duplex-Long Term Evolution), and frequency division duplex-long term evolution (FDD-LTE, Frequency Division Duplex-Long Term Evolution).

It can be seen that, in the method for calibrating a channel according to the embodiment of the present invention, slide-window correlation is performed on a delayed downlink service signal of a current transmit channel and a feedback signal of the transmit channel, and a group of correlation values of the transmit channel in a sliding window are obtained by sampling, where the sliding window is a time window for sampling the correlation values; a peak amplitude value among amplitude values of the group of correlation values in the sliding window is determined, and amplitude values of two points that are left adjacent and right adjacent to a point corresponding to the peak amplitude value are determined; an interpolation operation is performed on the peak amplitude value and the amplitude values of the two points that are left adjacent and right adjacent to the point to obtain an amplitude value, a delay and a phase at an actual peak point in the group of correlation values of the transmit channel in the sliding window; and the transmit channel is calibrated according to the amplitude value, the delay and the phase at the actual peak point. In this way, the channel is calibrated by using the structure of the service signal, without the need of transmitting a probe signal; and interference caused by the probe signal to the service signal is avoided while the channel is calibrated.

In addition, the time required for channel calibration in the present invention is shortened by about 4 orders of magnitude or above compared with the prior art, that is, dozens of seconds are shortened to several milliseconds. The method provided in the present invention is a fast channel calibration method. Taking UMTS as an example, the time required for calibrating each channel is 76 us. Even if the time for stabilizing a transfer switch is added, the time required for calibrating each channel is less than 100 us, and the time required for calibrating 16 channels is less than 1.6 ms. In the channel calibration solution in the prior art, taking −30 dB as an example, the signal-to-noise ratio of the probe signals of 16 channels is −42 dB, the signal-to-noise ratio required by calibration precision is more than 40 dB, and therefore, a coherent accumulated gain is 82 dB, a corresponding coherent accumulation length is 1.58*10^8 T chips, and a time length is 42 s. Meanwhile, the method for calibrating a channel in the present invention imposes no impact on fast closed-loop power control and DPD LUT update, and does not need to disable the closed-loop power control and DPD LUT table update; however, in the channel calibration solution in the prior art, interference is caused to other operations for the transmit channel, such as fast closed-loop power control and DPD operation. Calibration of a transmit channel in the prior art needs to disable the fast closed-loop power control and the DPD LUT update. Generally, the period of the closed-loop power control or DPD LUT update ranges from dozens to hundreds of milliseconds, which may lead to power fluctuation and abrupt change of a DPD LUT table and causes risks of outband spurious emission. Therefore, the method for calibrating a channel in the present invention avoids the risks of outband spurious emission.

Further, the method for calibrating a channel according to the embodiment of the present invention eliminates the restriction that a traffic channel and a feedback channel need to share a local oscillator, reduces frequency deviation requirements, and increases flexibility of system design.

Figure 4:
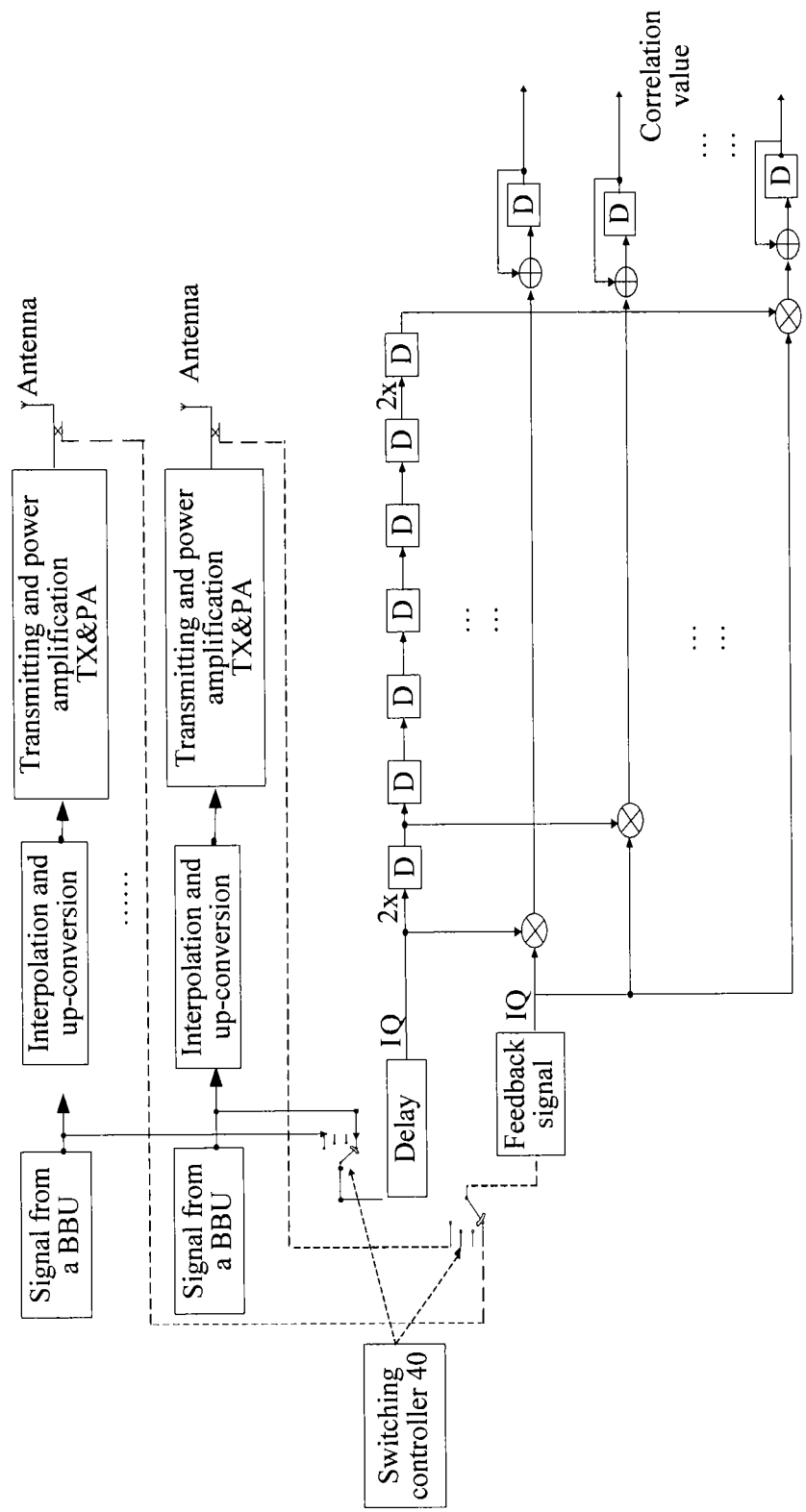
FIG. 4 is a principle diagram of calibrating a channel according to an embodiment of the present invention.
Figure 5:
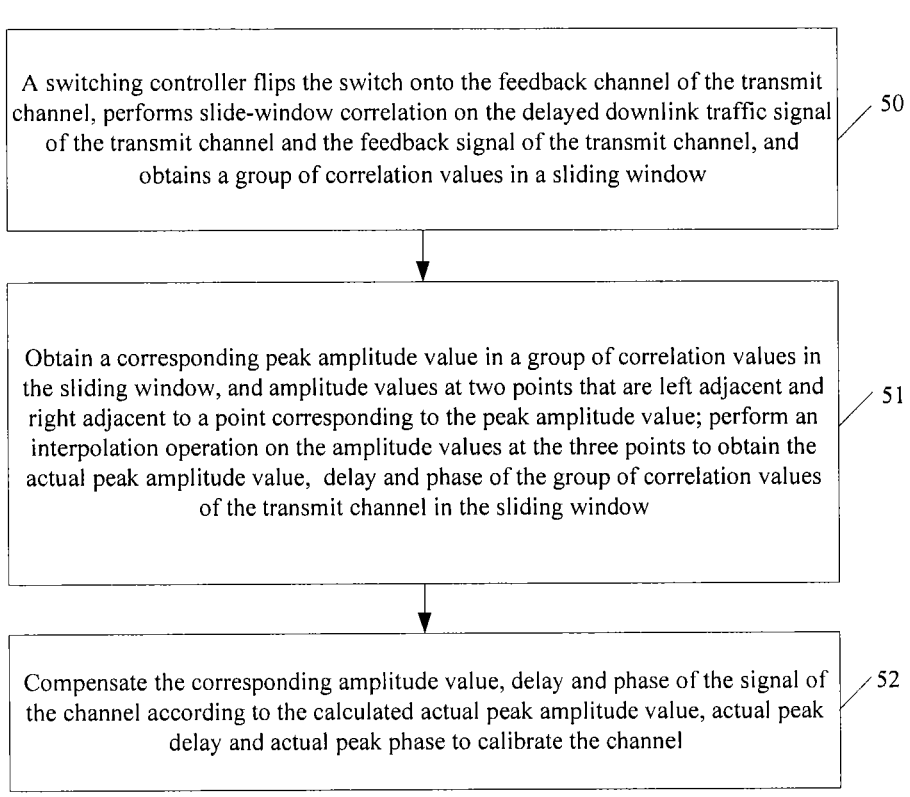
FIG. 5 is an actual operation flowchart of channel calibration principles shown in FIG. 4.

Principles of implementing an embodiment of the channel calibration method of the present invention are shown in FIG. 4. When a switching controller 40 flips a switch to a channel, the corresponding switch for controlling a feedback signal is flipped onto the feedback signal that connects the channel, so as to calibrate the channel; a delay controller exercises control to perform slide-window correlation on a downlink service signal and a corresponding feedback signal after every specific time of delay, so as to obtain a group of correlation values; a peak amplitude value among amplitude values of the group of correlation values is determined, and amplitude values at two points that are left adjacent and right adjacent to a point corresponding to the peak amplitude value are determined, and then an interpolation operation is performed on the peak amplitude value and the amplitude values at the two points that are left adjacent and right adjacent to the point to obtain the actual peak amplitude value, delay and phase of the group of correlation values. The actual peak amplitude value, delay, and phase are used to compensate the signal of the channel, thereby calibrating the channel. To calibrate other channels, it only needs to flip the switch of the switching controller 40 onto a corresponding downlink service signal and feedback signal. The whole implementation process consumes a little time and suffers no interference from a probe signal. The corresponding detailed method for calibrating a channel is shown in FIG. 5. The process of calibrating a transmit channel includes the following steps:

Step 50: The switching controller flips the switch onto the feedback channel of the transmit channel, performs slide-window correlation on the delayed downlink service signal of the transmit channel and the feedback signal of the transmit channel, and obtains a group of correlation values in a sliding window.

A correlation length may be more than 100 sampling points, for example, 300 sampling points. Because the EVM of the transmit signal is generally below 10% (−20 dB), the signal-to-noise ratio of a correlation peak is above 44 dB. The size of the sliding window depends on a predicted relative delay difference between channels, and the size of the sliding window is greater than the relative delay difference between channels.

Step 51: Obtain a peak amplitude value among amplitude values of the group of correlation values in the sliding window, and amplitude values at two points that are left adjacent and right adjacent to a point corresponding to the peak amplitude value; perform an interpolation operation on the amplitude values at the three points to obtain an amplitude value, a delay and a phase at an actual peak point in the group of correlation values of the transmit channel in the sliding window.

Step 52: Compensate the corresponding amplitude value, delay and phase of a signal of the transmit channel according to the calculated amplitude value, delay and phase at the actual peak point to calibrate the channel.

Flip the switch of the switching controller onto the feedback channel of another transmit channel, and repeat steps 51 to 52 to obtain the channel data of the another transmit channel.

By analogy, the switch of the switching controller traverses all channels to measure the amplitudes, delays and phases of all transmit channels, and therefore, each transmit channel can be calibrated according to the measured amplitude, delay, and phase of the channel.

The method according to this embodiment calibrates a channel by using the structure of the service signal, without the need of transmitting a probe signal. Therefore, the interference caused by the probe signal to the service signal is avoided while the channel is calibrated.

Figure 6:
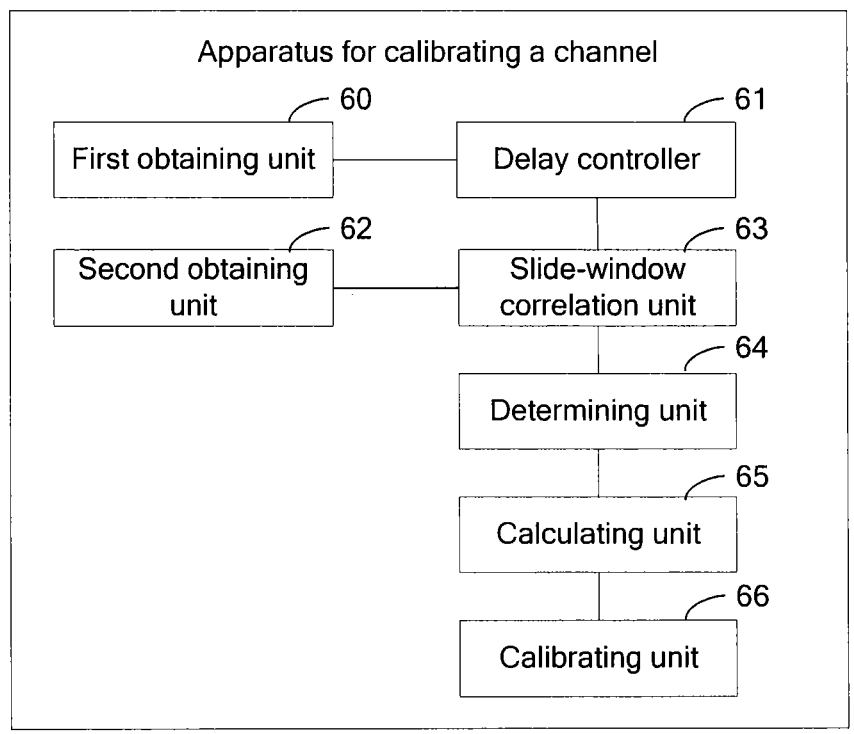
FIG. 6 is a schematic structural diagram of an apparatus for calibrating a channel according to an embodiment of the present invention.

An embodiment of the present invention further provides an apparatus for calibrating a channel. As shown in FIG. 6, the apparatus includes:

a first obtaining unit 60, configured to obtain a delayed downlink service signal of a current transmit channel;

a delay controller 61, configured to control the first obtaining unit 60 to obtain the delayed downlink service signal of the current transmit channel after the specific time of delay;

a second obtaining unit 62, configured to obtain a feedback signal of the channel;

a slide-window correlation unit 63, configured to perform slide-window correlation on the obtained delayed downlink service signal and the obtained feedback signal of the channel, and perform sampling to obtain a group of correlation values of the channel in a sliding window; where the sliding window is a time window for sampling the correlation values, and a correlation length of the slide-window may be more than 100 sampling points, for example, 300 sampling points; the size of the sliding window depends on a predicted delay difference between channels, and it is assumed that the size of the sliding window is greater than the relative delay difference between channels;

a determining unit 64, configured to determine a peak amplitude value among amplitude values of the group of correlation values in the sliding window, and amplitude values at two points that are left adjacent and right adjacent to a point corresponding to the peak amplitude value, where for the method for determining the peak amplitude value and the amplitude values at the two points that are left adjacent and right adjacent to the point, reference can be made to the above description, and details are not repeated;

a calculating unit 65, configured to perform an interpolation operation on the peak amplitude value and the amplitude values of the two points that are left adjacent and right adjacent to the point to obtain the actual peak amplitude value, delay, and phase of the group of correlation values of the transmit channel in the sliding window, where for the method of the interpolation operation, reference can be made to the above description, and details are not repeated; and a calibrating unit 66, configured to calibrate the channel according to the actual peak amplitude value, delay, and phase.

Figure 7:
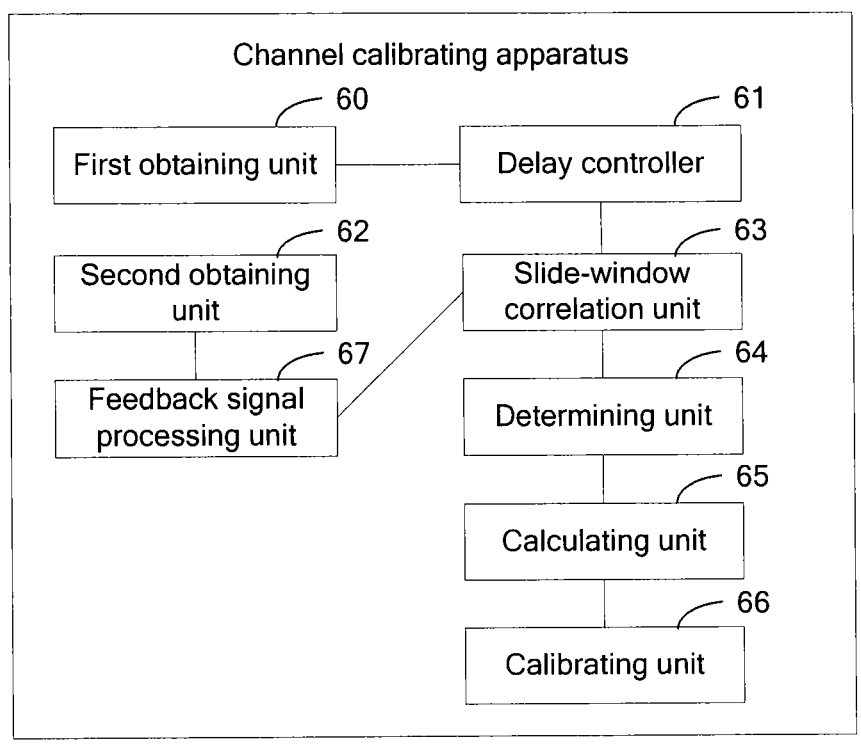
FIG. 7 is a schematic structural diagram of an apparatus for calibrating a channel according to another embodiment of the present invention.

Optionally, as shown in FIG. 7, the apparatus may further include:

a feedback signal processing unit 67, configured to descramble and coherent-accumulate the obtained feedback signal of each channel before the slide-window correlation.

Figure 8:
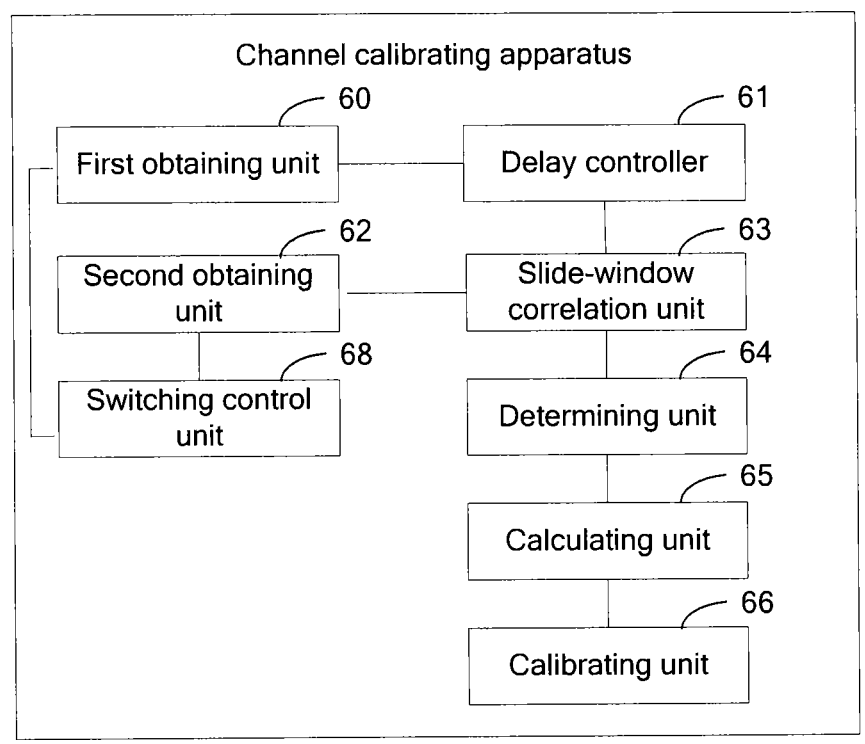
FIG. 8 is a schematic structural diagram of an apparatus for calibrating a channel according to another embodiment of the present invention.

Or, optionally, as shown in FIG. 8, the apparatus may further include:

a switching controller 68, configured to control the first obtaining unit 60 and the second obtaining unit 62 to obtain a signal of another channel after one channel is calibrated, so as to calibrate the another channel, for example, control to flip each switch onto a corresponding signal of the another channel. FIG. 3 shows a scenario where a switching controller is included.

The apparatus according to this embodiment may be a stand-alone apparatus set for calibrating channels, or an apparatus as a result of extending each existing processor of a transmitter, for example, extending a field programmable gate array (FPGA, Field Programmable Gate Array), and a digital signal processor (DSP, Digital Signal Processor), to implement the function of channel calibration.

The apparatus provided in the embodiment of the present invention calibrates a channel by using the structure of the service signal, without the need of transmitting a probe signal. Therefore, the interference caused by the probe signal to the service signal is avoided.

In addition, the time required for channel calibration in the present invention is shortened by about 4 orders of magnitude or above compared with the prior art, that is, dozens of seconds are shortened to several milliseconds. The method provided in the present invention is a fast channel calibration method. Taking UMTS as an example, the time required for calibrating each channel is 76 us. Even if the time for stabilizing a transfer switch is added, the time required for calibrating each channel is less than 100 us, and the time required for calibrating 16 channels is less than 1.6 ms.

Meanwhile, the method for calibrating a channel in the present invention imposes no impact on fast closed-loop power control and DPD LUT update, and does not need to disable the closed-loop power control and DPD LUT table update; and the method eliminates the restriction that a traffic channel and a feedback channel need to share a local oscillator, reduces frequency deviation requirements, and increases flexibility of system design.

An embodiment of the present invention further provides a multi-antenna beamforming system. The apparatus for calibrating a channel, which is described in the previous embodiment, is set on a transmitter of the system and is configured to calibrate each transmit channel.

Overall, the embodiment of the present invention implements channel calibration by using the structure of the service signal, without the need of transmitting a probe signal. Therefore, the interference caused by the probe signal to the service signal is avoided.

In addition, the time required for channel calibration in the present invention is shortened by about 4 orders of magnitude or above compared with the prior art, that is, dozens of seconds are shortened to several milliseconds. The method in the present invention is a fast channel calibration method. Taking UMTS as an example, the time required for calibrating each channel is 76 us. Even if the time for stabilizing a transfer switch is added, the time required for calibrating each channel is less than 100 us, and the time required for calibrating 16 channels is less than 1.6 ms.

Meanwhile, the method for calibrating a channel in the present invention imposes no impact on fast closed-loop power control and DPD LUT update, and does not need to disable the closed-loop power control and DPD LUT table update; and the method eliminates the restriction that a traffic channel and a feedback channel need to share a local oscillator, reduces frequency deviation requirements, and increases flexibility of system design.

Persons of ordinary skill in the art may understand that all or a part of the steps of the methods in the embodiments may be implemented by a common program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Random Access Memory, RAM).

The foregoing description is merely about exemplary embodiments of the present invention, but is not intended to limit the protection scope of the present invention. Any variation or replacement figured out by persons skilled in the art within the technical scope disclosed in the present invention shall fall within the protection scope of the present invention. Therefore, the protection scope of the present invention shall be subject to the protection scope of the claims.

What is claimed is:

1. A method for calibrating a channel, comprising:

performing slide-window correlation on a delayed downlink service signal of a current transmit channel and a feedback signal of the transmit channel, and performing sampling to obtain a group of correlation values of the transmit channel in a sliding window, wherein the sliding window is a time window for sampling the correlation values;

determining a peak amplitude value among amplitude values of the group of correlation values in the sliding window and amplitude values at two points that are left adjacent and right adjacent to a point corresponding to the peak amplitude value;

performing an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window; and calibrating the transmit channel according to the amplitude value, the delay, and the phase at the actual peak point, wherein the determining the peak amplitude value among amplitude values of the group of correlation values in the sliding window, and amplitude values at two points that are left adjacent and right adjacent to a point corresponding to the peak amplitude value, comprises:

using the following formula to calculate an amplitude value p at each of multiple sampling points in the group of correlation values in the sliding window:

$$p = \sqrt{I^2 + Q^2}, \exp(j*\theta) = (I + jQ)/\sqrt{I^2 + Q^2},$$

wherein I represents an in-phase part of data at the sampling point in the group of correlation values; Q represents a quadrature part of data at the sampling point in the group of correlation values; j represents an imaginary unit; θ represents a phase at the sampling point in the group of correlation values; and exp (j* θ) represents a complex phase, and determining a peak amplitude value $P_0$ among amplitude values at the multiple sampling points in the group of correlation values in the sliding window according to a calculation result, and amplitude values $P_1$ and $P_2$ at two points that are left adjacent and right adjacent to a point corresponding to the peak amplitude value; and wherein the interpolation on the peak amplitude value and the amplitude values of the two points that are left adjacent and right adjacent to the point to obtain an amplitude value, a delay, and a phase at an actual peak point in the group of correlation values of the transmit channel in the sliding window comprises:

using the following formula to calculate an amplitude value $p_{peak}$ and a delay τ at the actual peak point in the group of correlation values of the channel in the sliding window:

$$\tau = \frac{p_1 - p_2}{2p_0 - (p_1 + p_2)} \frac{T_c}{2},$$

$$p_{peak} = p_0 + \frac{1}{8} * \frac{(p_1 - p_2)^2}{(2p_0 - (p_1 + p_2))},$$

wherein $T_c$ represents a chip duration, $P_0$ is the peak amplitude value among the amplitude values at the multiple sampling points in the group of correlation values in the sliding window, and $P_1$ and $P_2$ are the amplitude values at the two points that are left adjacent and right adjacent to the point corresponding to the peak amplitude value, and using the following formula to calculate a phase value $\exp(j\theta_{peak})$ at the actual peak point in the group of correlation values of the channel in the sliding window:

$$\exp(j\theta_{peak}) = \frac{phaser}{\sqrt{I^2_{Phaser} + Q^2_{Phaser}}};$$

wherein $$phaser = \frac{p_0\exp(j\theta_0) + p_1\exp(j\theta_1) + p_2\exp(j\theta_2)}{p_0 + p_1 + p_2},$$

wherein phaser represents a value obtained after weighted-averaging is performed on a point corresponding to the peak amplitude value among the amplitude values at the multiple sampling points in the group of correlation values and two adjacent points, j represents the imaginary unit, $\theta_0$ represents a peak phase value corresponding to the peak amplitude value among the amplitude values at the multiple sampling points in the group of correlation values in the sliding window, $\theta_1$ and $\theta_2$ represent phase values corresponding to the amplitude values $P_1$ and $P_2$ at the two points that are left adjacent and right adjacent to the point corresponding to the peak amplitude value, respectively; $P_0$ is the peak amplitude value among the amplitude values at the multiple sampling points in the group of correlation values in the sliding window, $P_1$ and $P_2$ are the amplitude values at the two points that are left adjacent and right adjacent to the point corresponding to the peak amplitude value, $I_{phaser}$ represents an in-phase part of the actual peak point, and $Q_{phaser}$ represents a quadrature part of the actual peak point.

2. The method according to claim 1, wherein
before the performing slide-window correlation on a delayed downlink service signal of a current transmit channel and a feedback signal of the transmit channel, the method further comprises:
descrambling and coherent-accumulating the feedback signal of the transmit channel.

3. The method according to claim 1, wherein
a length of the sliding window is greater than a relative delay difference between channels.

4. The method according to claim 1, wherein the calibrating the transmit channel according to the amplitude value, the delay, and the phase at the actual peak point comprises:
compensating a corresponding amplitude value, delay and phase of a signal of the transmit channel according to the amplitude value, delay and phase at the actual peak point to implement the calibration.

5. An apparatus for calibrating a channel, comprising:
a first obtaining unit, configured to obtain a delayed downlink service signal of a current transmit channel;
a delay controller, configured to control the first obtaining unit to obtain the delayed downlink service signal of the current transmit channel after specific time of delay;
a second obtaining unit, configured to obtain a feedback signal of the channel;
a slide-window correlation unit, configured to perform slide-window correlation on the obtained delayed downlink service signal and the obtained feedback signal of the channel, and perform sampling to obtain a group of correlation values of the channel in a sliding window, wherein the sliding window is a time window for sampling the correlation values;
a determining unit, configured to determine a peak amplitude value among amplitude values of the group of correlation values in the sliding window and amplitude values at two points that are left adjacent and right adjacent to a point corresponding to the peak amplitude value;
a calculating unit, configured to perform an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window; and
a calibrating unit, configured to calibrate the transmit channel according to the amplitude value, the delay, and the phase at the actual peak point,
wherein the determination, by the determination unit, of the peak amplitude value among amplitude values of the group of correlation values in the sliding window, and amplitude values at two points that are left adjacent and right adjacent to a point corresponding to the peak amplitude value, comprises:
using the following formula to calculate an amplitude value p at each of multiple sampling points in the group of correlation values in the sliding window:

$$p=\sqrt{I^2+Q^2}, \exp(j*\theta)=(I+jQ)/\sqrt{I^2+Q^2},$$

wherein I represents an in-phase part of data at the sampling point in the group of correlation values; Q represents a quadrature part of data at the sampling point in the group of correlation values; j represents an imaginary unit; $\theta$ represents a phase at the sampling point in the group of correlation values; and $\exp(j*\theta)$ represents a complex phase, and
determining a peak amplitude value $P_0$ among amplitude values at the multiple sampling points in the group of correlation values in the sliding window according to a calculation result, and amplitude values $P_1$ and $P_2$ at two points that are left adjacent and right adjacent to a point corresponding to the peak amplitude value; and
wherein the interpolation, by the calculating unit, on the peak amplitude value and the amplitude values of the two points that are left adjacent and right adjacent to the point to obtain an amplitude value, a delay, and a phase at an actual peak point in the group of correlation values of the transmit channel in the sliding window comprises:
using the following formula to calculate an amplitude value $p_{peak}$ and a delay $\tau$ at the actual peak point in the group of correlation values of the channel in the sliding window:

$$\tau = \frac{p_1 - p_2}{2p_0 - (p_1 + p_2)} \frac{T_c}{2}, p_{peak} = p_0 + \frac{1}{8} * \frac{(p_1 - p_2)^2}{(2p_0 - (p_1 + p_2))},$$

wherein $T_c$ represents a chip duration, $P_0$ is the peak amplitude value among the amplitude values at the multiple sampling points in the group of correlation values in the sliding window, and $P_1$ and $P_2$ are the amplitude values at the two points that are left adjacent and right adjacent to the point corresponding to the peak amplitude value, and using the following formula to calculate a phase value $\exp(j\theta_{peak})$ at the actual peak point in the group of correlation values of the channel in the sliding window:

$$\exp(j\theta_{peak}) = \frac{\text{phaser}}{\sqrt{I_{Phaser}^2 + Q_{Phaser}^2}};$$

$$\text{wherein phaser} = \frac{p_0 \exp(j\theta_0) + p_1 \exp(j\theta_1) + p_2 \exp(j\theta_2)}{p_0 + p_1 + p_2},$$

wherein phaser represents a value obtained after weighted-averaging is performed on a point corresponding to the peak amplitude value among the amplitude values at the multiple sampling points in the group of correlation values and two adjacent points, j represents the imaginary unit, $\theta_0$ represents a peak phase value corresponding to the peak amplitude value among the amplitude values at the multiple sampling points in the group of correlation values in the sliding window, $\theta_1$ and $\theta_2$ represent phase values corresponding to the amplitude values $P_1$ and $P_2$ at the two points that are left adjacent and right adjacent to the point corresponding to the peak amplitude value, respectively; $P_0$ is the peak amplitude value among the amplitude values at the multiple sampling points in the group of correlation values in the sliding window, $P_1$ and $P_2$ are the amplitude values at the two points that are left adjacent and right adjacent to the point corresponding to the peak amplitude value, $I_{phaser}$ represents an in-phase part of the actual peak point, and $Q_{phaser}$ represents a quadrature part of the actual peak point.

6. The apparatus according to claim 5, wherein the calibrating unit is specifically configured to compensate a corresponding amplitude value, delay and phase of a signal of the transmit channel according to the amplitude value, delay and phase at the actual peak point to implement the calibration.

7. The apparatus according to claim 5, further comprising:
a feedback signal processing unit, configured to descramble and coherent-accumulate the obtained feedback signal of the current transmit channel, wherein
correspondingly, the slide-window correlation unit is specifically configured to perform slide-window correlation on the delayed downlink service signal of the transmit channel and the feedback signal that is descrambled and coherent-accumulated, and perform sampling to obtain a group of correlation values of the transmit channel in a sliding window, wherein the sliding window is a time window for sampling the correlation values.

8. The apparatus according to claim 5, further comprising:
a switching controller, configured to control the first obtaining unit and the second obtaining unit to obtain a signal of another channel after the current transmit channel is calibrated, so as to calibrate the another channel.

9. A multi-antenna beamforming system, comprising:
an apparatus for calibrating a channel, configured to calibrate each transmit channel, the apparatus comprises:
a first obtaining unit, configured to obtain a delayed downlink service signal of a current transmit channel;

a delay controller, configured to control the first obtaining unit to obtain the delayed downlink service signal of the current transmit channel after specific time of delay;

a second obtaining unit, configured to obtain a feedback signal of the channel;

a slide-window correlation unit, configured to perform slide-window correlation on the obtained delayed downlink service signal and the obtained feedback signal of the channel, and perform sampling to obtain a group of correlation values of the channel in a sliding window, wherein the sliding window is a time window for sampling the correlation values;

a determining unit, configured to determine a peak amplitude value among amplitude values of the group of correlation values in the sliding window and amplitude values at two points that are left adjacent and right adjacent to a point corresponding to the peak amplitude value;

a calculating unit, configured to perform an interpolation operation on the peak amplitude value and the amplitude values of the two points that are left adjacent and right adjacent to the point to obtain an amplitude value, a delay, and a phase at an actual peak point in the group of correlation values of the transmit channel in the sliding window; and a calibrating unit, configured to calibrate the transmit channel according to the amplitude value, the delay, and the phase at the actual peak point, wherein the determination, by the determining unit, of the peak amplitude value among amplitude values of the group of correlation values in the sliding window, and amplitude values at two points that are left adjacent and right adjacent to a point corresponding to the peak amplitude value, comprises:

using the following formula to calculate an amplitude value p at each of multiple sampling points in the group of correlation values in the sliding window:

$$p = \sqrt{I^2 + Q^2}, \exp(j*\theta) = (I + jQ)/\sqrt{I^2 + Q^2},$$

wherein I represents an in-phase part of data at the sampling point in the group of correlation values; Q represents a quadrature part of data at the sampling point in the group of correlation values; j represents an imaginary unit; $\theta$ represents a phase at the sampling point in the group of correlation values; and $\exp(j*\theta)$ represents a complex phase, and determining a peak amplitude value $P_0$ among amplitude values at the multiple sampling points in the group of correlation values in the sliding window according to a calculation result, and amplitude values $P_1$ and $P_2$ at two points that are left adjacent and right adjacent to a point corresponding to the peak amplitude value; and wherein the interpolation, by the calculating unit, on the peak amplitude value and the amplitude values of the two points that are left adjacent and right adjacent to the point to obtain an amplitude value, a delay, and a phase at an actual peak point in the group of correlation values of the transmit channel in the sliding window comprises:

using the following formula to calculate an amplitude value $p_{peak}$ and a delay $\tau$ at the actual peak point in the group of correlation values of the channel in the sliding window:

$$\tau = \frac{p_1 - p_2}{2p_0 - (p_1 + p_2)} \frac{T_c}{2}, p_{peak} = p_0 + \frac{1}{8} * \frac{(p_1 - p_2)^2}{(2p_0 - (p_1 + p_2))},$$

wherein $T_c$ represents a chip duration, $P_0$ is the peak amplitude value among the amplitude values at the multiple sampling points in the group of correlation values in the sliding window, and $P_1$ and $P_2$ are the amplitude values at the two points that are left adjacent and right adjacent to the point corresponding to the peak amplitude value, and using the following formula to calculate a phase value $\exp(j\theta_{peak})$ at the actual peak point in the group of correlation values of the channel in the sliding window:

$$\exp(j\theta_{peak}) = \frac{phaser}{\sqrt{I^2_{Phaser} + Q^2_{Phaser}}};$$

$$\text{wherein phaser} = \frac{p_0 \exp(j\theta_0) + p_1 \exp(j\theta_1) + p_2 \exp(j\theta_2)}{p_0 + p_1 + p_2},$$

wherein phaser represents a value obtained after weighted-averaging is performed on a point corresponding to the peak amplitude value among the amplitude values at the multiple sampling points in the group of correlation values and two adjacent points, j represents the imaginary unit, $\theta_0$ represents a peak phase value corresponding to the peak amplitude value among the amplitude values at the multiple sampling points in the group of correlation values in the sliding window, $\theta_1$ and $\theta_2$ represent phase values corresponding to the amplitude values $P_1$ and $P_2$ at the two points that are left adjacent and right adjacent to the point corresponding to the peak amplitude value, respectively; $P_0$ is the peak amplitude value among the amplitude values at the multiple sampling points in the group of correlation values in the sliding window, $P_1$ and $P_2$ are the amplitude values at the two points that are left adjacent and right adjacent to the point corresponding to the peak amplitude value, $I_{phaser}$ represents an in-phase part of the actual peak point, and $Q_{phaser}$ represents a quadrature part of the actual peak point.

10. The apparatus according to claim 9, wherein the calibrating unit is specifically configured to compensate a corresponding amplitude value, delay and phase of a signal of the transmit channel according to the amplitude value, delay and phase at the actual peak point to implement the calibration.

11. The apparatus according to claim 9, further comprising:
a feedback signal processing unit, configured to descramble and coherent-accumulate the obtained feedback signal of the current transmit channel, wherein
correspondingly, the slide-window correlation unit is specifically configured to perform slide-window correlation on the delayed downlink service signal of the transmit channel and the feedback signal that is descrambled and coherent-accumulated, and perform sampling to obtain a group of correlation values of the transmit channel in a sliding window, wherein the sliding window is a time window for sampling the correlation values.

12. The apparatus according to claim 9, further comprising:
a switching controller, configured to control the first obtaining unit and the second obtaining unit to obtain a signal of another channel after the current transmit channel is calibrated, so as to calibrate the another channel.

* * * * *